US006926918B2

(12) United States Patent
LeBlanc

(10) Patent No.: US 6,926,918 B2
(45) Date of Patent: Aug. 9, 2005

(54) FISH HYDROLYSATES AS SALT REPLACEMENT

(75) Inventor: Raynald Jacques LeBlanc, Stratford (CA)

(73) Assignee: Ocean Nutrition Canada Limited, Halifax (CA)

( * ) Notice: Subject to any disclaimer, the term of this patent is extended or adjusted under 35 U.S.C. 154(b) by 519 days.

(21) Appl. No.: 10/095,231

(22) Filed: Mar. 11, 2002

(65) Prior Publication Data

US 2003/0170373 A1 Sep. 11, 2003

(51) Int. Cl.[7] ........................... A23L 1/237; A23L 1/221
(52) U.S. Cl. ....................... 426/649; 426/650; 426/589
(58) Field of Search ................................ 426/648, 649, 426/650, 652, 656, 657, 589, 61, 63, 533, 534

(56) References Cited

FOREIGN PATENT DOCUMENTS

| CA | 2361681 | 6/2001 | ........... C12P/21/06 |
|---|---|---|---|
| EP | 1092724 | 4/2001 | ........... C07K/5/04 |
| JP | 58-190373 | * 11/1983 | |
| JP | 59017942 | 1/1984 | |
| JP | 01300872 | 5/1989 | |
| JP | 4-346768 | * 12/1992 | |
| JP | 07289197 | 11/1995 | |

OTHER PUBLICATIONS

Fujita, Hiroyuki. "Purification of angiotensin–I converting enzyme (ACE) inhibitory peptides". CA Plus abstract AN 2001:651418.
Fujita, et al, (2001) "Effects of an ace–inhibitory agent, katsuobushi oligopeptide, in the spontaneously hypertensive rat and in borderline and mildly hypertensive subjects" *Nutrition Research* 21:1149–1158.
Imm et al. "Production of Seafood Flavor from Red Hake (Urophycis chuss) by Enzymatic Hydrolysis". CA Plus abstract AN 1999:300506.
International Food Information Council Foundation "Food Editors Prefer "Umami" Taste Sensation" (1992).
Ishii et al. "Effect of peptides in wheat gluten hydrolyzate on basic tastes". CA Plus abstract AN 1995:140006.
Kristinsson and Rasco. (2000) "Fish protein hydrolysates: production, biochemical and functional properties," *Crit. Rev. Food Sci. Nutr.*, (40)1:43–81, pp. 71–73 and 80 provided.
Kuninaka, Akira. "Flavor potentiators". CA Plus abstract AN 1968:38352.
Machashi, et al. "Isolation of peptides from an enzymic hydrolysate of food proteins and characterization of their taste properties." PubMed abstract ID 10227142 (1999).
Miura et al. "Preparation of a new type of seasoning by hydrolysis of a mixture of animal and plant proteins." CA Plus abstract AN 1987:438250.

Nagodawithana, et al. "Savory flavors". CA Plus abstract AN 1995:133642.
New York Scramble: Internet site (Jan. 23, 2002) http://www.nyscramble.com/e/content_1179558020.html.
Nobehara, Akio. "Bonito flavor seasoning". CA Plus abstract AN 1974:412068.
Noguchi, et al. (1975) "Isolation and Identification of Acidic Oligopeptides Occuring in a Flavor Potentiating Fraction from a Fish Protein Hydrolysate" *J. Agr. Food Chem.* 23(1):49–53.
Oh, Kwang–Soo, "Taste characteristics and functionality of a two–stage enzyme hydrolysate from low–utilized long–finned squid". CA Plus abstract AN 2001:889077.
Ohta et al. "Salt flavor enhancers for manufacturing seasoning and food". CA Plus abstract AN 2001:416718.
Parekh et al. "Method for producing flavor base".CA Plus abstract AN 2000:756470.
Spanier, et al. "The difficulties in assessing the sensory characteristics of peptide–derived flavor enhancers." CA Plus abstract AN 1997:485744.
Takasaki, et al., "Aroma of a new seasoning, II. Volatile components of new hydrolyzed protein seasoning." CA Plus abstract AN 1986:589636.
Tamura, et al. "Practical debittering using model peptides and related compounds." PubMed abstract ID 1368525 (1990).
Tanaka et al. "Manufacturing of concentrated extracts from lizardfish paste manufacture wastes". CA Plus abstract AN (1996)483164.
Toshinori et al. Abstract of JP 60–062956 published Apr. 11, 1985.
Tsuchida et al. "Powdered condiments containing wheat gluten hydrolyzates and their enzyme manufacture". CA Plus abstract AN 2001:622519.
Uchiwa et al. "Peptide composition from blood–containing fish meat". CA Plus abstract AN 1991:534629.
Wu, et al. "Experimental preparation of nutrient liquid from shellfish Pinctada martensii meat and nutritional evaluation." CA Plus abstract AN 2001:115803.
Yokoyama , et al, (Oct., 1992) "Peptide Inhibitors for Angiotensin I–Converting Enzyme from Thermolysin Digest of Dried Bonito" *Biosci Biotech. Biochem.* 56(10):1541–5.
Alder–Nissen, J. (1986) "Enzymatic hydrolysis of foods", Elsevier Applied Science Publishers, Barking, UK, pp. 9–24, 57–109, 110–131. (To Follow).
Alder–Nissen, J. (1993) Proteases, Chapter 7, In Enzymes in Food Processing, Third Edition, Nagodawithana, T. and Reed, G. Eds. Academic Press, Inc., San Diego, USA, pp. 159–203.

(Continued)

Primary Examiner—Keith Hendricks
(74) Attorney, Agent, or Firm—Welsh & Katz, Ltd.

(57) ABSTRACT

Bonito hydrolysate (e.g. katsuobushi oligopeptide (KO)) enhances the flavour of salt and may be used to replace salt in foods and beverages.

26 Claims, 2 Drawing Sheets

OTHER PUBLICATIONS

Barzana, E., et al. (1994) "Production of fish protein concentrates" In Fisheries Processing: Biotechnological applications, Martin, A.M. ed. Chapman & Hall: London.

Hevia, P., et al. (1977) "Flavor of Enzyme–Solubilized Fish Protein Concentrate Fractions" J. Agric. Food Chem., vol. 25, No. 4, pp. 772–775.

Imm, J.Y., et al. (1999) "Production of Seafood Flavor from Red Hake (*Urophycis chuss*)" Enzymatic Hydrolysis. J. Agric. Food Chem., 47:2360–2366.

Maehashi, K., et al. (1999) "Isolation of Peptides from an Enzymatic Hydrolysate of Food Proteins and Characterization of their Taste Properties" Biosci. Biotechnol. Biochem., 63(3):555–559.

Maehashi, K., et al. (2002) Ch. 4, "Taste Evaluation for Peptides in Protein Hydrolysates from Soybean and Other Plants" In Analysis of Taste and Aroma: Jackson, J.F. and Linskens, H.F. Eds.; Springer: Berlin, pp. 47–68.

Murray, T.K., et al. (1952) "Studies on Protein Hydrolysis. I.–Preliminary Observations on the Taste of Enzymic Protein Hydrolysates" J. Sci. Food Agric., 3:470–475.

Nakamura, K., et al. (1996) "Convenient Synthesis of L–Ornithyltaurine HCI and the Effect on Saltiness in a Food Material", J. Agric. Food Chem., 44–2481–2485.

Noguchi, M., et al. (1975) "Isolation and Identification of Acidic Oligopeptides Occurring in a Flavor Potentiating Fraction from a Fish Protein Hydrolysate" J. Agr. Food Chem., vol. 23, No. 1, pp. 49–53.

Schlichtherle–Cerny, H., et al. (2002) "Analysis of Taste-–Active Compounds in an Enzymatic Hydrolysate of Deamidated Wheat Gluten", J. Agric. Food Chem., 50: 1515–1522.

Schlichtherle–Cerny, H., et al. (2000) "Analysis of taste–active compounds in protein hydrolysates by chemical and sensory methods" In Frontiers of Flavour Science: Characterization of flavour compounds by means of odor activity evalutation; Eds. Schieberle, P. and Engel, K.H.; Deutsche Forschungsanstalt für Lebensmittelchemie: Garching, Germany; pp. 89–93. (To Follow).

Stryer, Lubert (1995) Biochemistry. Chapter 3. W.H. Freeman and Company.

Venugopal, V., et al. (1981) "Isolation of proteins from low–priced fish", Fleischwirtsch, 61, (9), pp. 1368–1370.

Yokoyama, K., (1992) "Peptide Inhibitors for Angiotensin I–Converting Enzyme from Thermolysin Digest of Dried Bonito", Biosci. Biotech. Biochem., 56, (10), pp. 1541–1545.

Zapelena, M.J., et al., (1997), "Addition of a Neutral Proteinase from *Bacillus subtilis* (Neutrase) Together with a Starter to a Dry Fermented Sausage Elaboration and Its Effect on the Amino Acid Profiles and the Flavor Development", J. Agric. Food Chem. 45: 472–475.

* cited by examiner

FISH HYDROLYSATES AS SALT REPLACEMENT

FIELD OF THE INVENTION

This invention relates to the use of fish hydrolysates for replacing salt in foods and beverages.

BACKGROUND OF THE INVENTION

Sodium chloride ('salt') is used throughout the food industry to impart a 'salty' flavour to foods and beverages. However, sodium chloride is also known to cause an increase in blood pressure in mammals leading to a variety of cardiovascular diseases. To reduce its use, there is a need for compounds that do not elevate blood pressure yet can impart a 'salty' flavour in foods and beverages.

Certain protein hydrolysates, including fish protein enzymatic hydrolysates, are known to possess flavour potentiating activity and to have a flavour activity qualitatively resembling that of monosodium glutamate (MSG). However, the taste profiles and potentiating activities of protein hydrolysates, including fish protein hydrolysates, cannot be predicted a priori since the specific taste profiles and potentiating activities depend heavily on the particular species from which the protein is obtained and may depend on the method of hydrolysis.

Katsuobushi is a flavourant derived from dried bonito (tuna-like fish) used in traditional Japanese cuisine. Katsuobushi is produced from bonito muscle that has been boiled, smoked and fermented. It is known to have the 'umami' taste, which is a separate taste category from the classic basic taste categories of 'sweet', 'sour', 'bitter' and 'salty'.

Katsuobushi oligopeptide (KO) is a hydrolysate prepared by enzymatic digestion of katsuobushi with thermolysin. KO has blood pressure lowering properties because it contains peptides that inhibit the activity of angiotensin I-converting enzyme (ACE). In Japan, a soup containing KO has been approved as a "Food for Specific Health Use" (Fujita, et al. (2001) "Effects of an ACE-inhibitory agent, katsuobushi oligopeptide, in the spontaneously hypertensive rat and in borderline and mildly hypertensive subjects" *Nutrition Research* 21:1149–1158).

KO was developed specifically for its ACE inhibitory activity for application in functional foods. However, it could not be anticipated that KO would have the additional beneficial attribute of a salt-replacement substance.

SUMMARY OF THE INVENTION

There is provided a use of bonito hydrolysate for replacing salt in a food or beverage formulation having a final salt content of about 0.5% (w/v) or less, based on total concentration of sodium.

There is further provided a method comprising the step of adding bonito hydrolysate in place of salt to a food or beverage formulation, thereby resulting in the food or beverage having a reduced salt content while maintaining a saltier taste than would normally be perceived at the reduced salt content, wherein the salt content of the food or beverage is about 0.5% (w/v) or less, based on total concentration of sodium.

DETAILED DESCRIPTION

Bonito hydrolysate is derived from bonito protein by hydrolysis. In particular, katsuobushi oligopeptide (KO) is bonito hydrolysate derived from the enzymatic hydrolysis of dried bonito using thermolysin. It is understood that the hydrolysate encompasses both the mixture obtained directly from hydrolysis as well as the oligopeptides found in the mixture. KO is a commercial product and is described in Yokoyama, et al, (October 1992) "Peptide Inhibitors for Angiotensin I-Converting Enzyme from Thermolysin Digest of Dried Bonito" *Biosci Biotechnol Biochem* 56(10):1541–5, the entire disclosure of which is herein incorporated by reference.

While it is known that KO has a pleasant taste, it has now been found that bonito hydrolysate (e.g. KO) enhances the salty taste of sodium chloride (salt) and may be advantageously used in food and beverage formulations to replace salt, thereby reducing the amount of salt that must be used to achieve a certain level of perceived saltiness. Even more advantageously, it has been found that there is a markedly greater saltiness-enhancing effect at lower salt concentrations permitting an even greater reduction in the salt content of a food or beverage while maintaining a high saltiness flavour. KO may be advantageously used in foods and beverages having a salt (sodium) content of about 0.5% (w/v) or less, with the greatest enhancement of perceived saltiness being achieved when the salt concentration in the food or beverage is about 0.2% (w/v) or less, based on the total concentration of sodium.

Additionally, the reduction in the amount of salt coupled with the ACE-inhibitory properties of KO may lead to a greater reduction in hypertension in humans or other mammals who consume foods or beverages in which KO has been used to replace salt. Therefore, while the use of KO in foods may be known, it has now been shown that KO can be advantageously used to replace salt leading to healthier foods and beverages having a similar saltiness profile to foods or beverages with a much greater amount of salt.

Bonito hydrolysate may be added to foods or beverages as a solid or as a mixture of the hydrolysate in a physiologically acceptable liquid (e.g. water). As a solid, the hydrolysate may be, for example, in the form of a powder or a compact solid such as a bouillon cube. As a mixture in liquid, the hydrolysate may be, for example, in the form of a solution or a concentrate (e.g. paste). The hydrolysate may be added to foods or beverages during processing and/or preparation at the manufacturer and/or by the consumer at the point of consumption.

The hydrolysate may be used in any convenient amount that enhances the saltiness perception of the food or beverage formulation. Preferably, the hydrolysate may be used in an amount of about 0.5% (w/v) or less, more particularly from about 0.05% to about 0.5% (w/v) or from about 0.05% to about 0.2% (w/v). Yet more particularly, the hydrolysate may be used in an amount of about 0.2% (w/v) or of about 0.1% (w/v).

KO may be used to replace salt in any food or beverage in which it is desired to enhance the saltiness taste while maintaining lower salt (sodium) content. Some non-limiting examples include soups and soup bases, carbonated beverages (such as soft drinks), fruit juices and drinks, and sauces (such as soy sauce).

BRIEF DESCRIPTION OF THE DRAWINGS

The invention will now be described by way of example having regard to the appended drawing in which.

EXAMPLE

Figure 1:
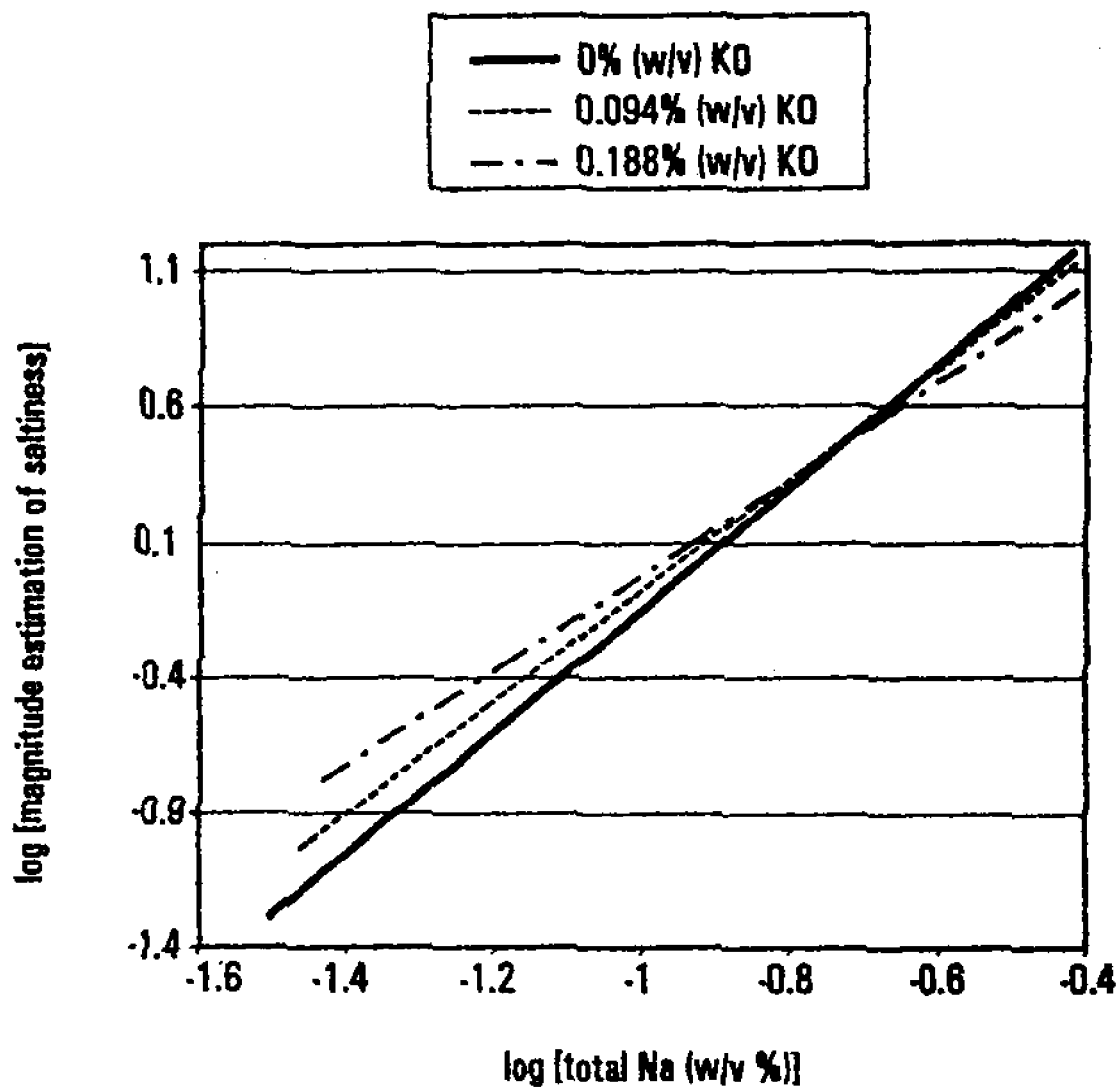
FIG. 1 is a graph of log [magnitude estimation of saltiness] versus log [total Na (% w/v)] for sample solutions containing 0.188% (w/v), 0.094% (w/v) and 0% (w/v) of katsuobushi oligopeptide (KO).

The effect of KO on saltiness perception was determined according to the following procedure.

Screening, Selecting and Training Panellists for Magnitude Estimation:

A potential panellist pool was drawn from volunteers. The volunteers were briefed on the objectives, requirements and experimental protocol of the study and were permitted to participate after reviewing and signing a consent form. Those who wished to participate were provided with a pre-screening questionnaire to collect basic health information, information on food habits and information on their ability to verbalise concepts about flavour and texture. Individuals who had allergies or conditions that may be triggered by the test material were excused from the study.

Those continuing in the study participated in a scaling exercise (Meilgaard, et al. (1991) *Sensory Evaluation Techniques*. $2^{nd}$ Ed. CRC Press, Inc., Boca Raton, Fla., the disclosure of which is hereby incorporated by reference) to evaluate how well they determined ratios based on the amount of shade in a set of figures. Individuals that were successful with the concept and task were then asked to assess a series of solutions for recognition of the four basic tastes: sweet, salty, bitter and sour. In this assessment, solutions as shown in Table 1 were prepared with Milli-Q™ water. The solutions and a blank of Milli-Q™ water were presented to participants in random order using a three-digit code to identify each solution. The participants were then asked to identify each solution.

TABLE 1

Solutions used to screen potential panellists

| Chemical | Basic taste | Concentration (% w/v) | | |
|---|---|---|---|---|
| Sucrose | Sweet | 0.4 | 0.6 | — |
| Sodium chloride | Salty | 0.08 | 0.15 | — |
| Caffeine | Bitter | 0.02 | 0.03 | 0.04 |
| Citric acid | Sour | 0.02 | 0.03 | — |

Ten candidates who successfully passed the screening to become panellists were then trained on the use of magnitude estimation.

Training Guidelines for Magnitude Estimation:

Part A: Panellists were presented with four (4) saline solution samples, which they sipped in a predetermined order and evaluated for saltiness. The panellist placed a vertical mark on a horizontal line indicating the perceived degree of saltiness for each sample and labelled the mark with the three-digit code on the sample container evaluated (e.g. sample codes 102, 123, 456 and 789). An example of how the results look is shown below.

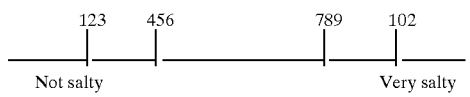

Part B: The panellists were then presented with four (4) sucrose solutions, which they sipped in a predetermined order and evaluated for sweetness. In a similar manner as Part A above, the panellists placed a vertical mark on a horizontal line indicating the perceived degree of sweetness for each sample and labelled the mark with the three-digit code on the sample container evaluated.

Part C: Panellists were presented with and told to sip a reference saline solution. They were told to arbitrarily assign a value of 10 to the perceived level of saltiness of the reference solution. Panellists were also presented with a series of three saline solution samples and told that their task was to tell how salty the samples seem. If a sample seemed nineteen times as salty than the reference, the panellists would assign the sample a number 19 times as large (i.e. 10×19=190). If the sample seemed one-eleventh as salty as the reference, then the panellists would assign the sample a number 1/11 as large (i.e. 10/11 or around 0.9). The panellists were told to use numbers, fractions, and decimals, but to make each assignment proportional to the saltiness, as perceived by the panellist. The samples were evaluated in the order presented to the panellist.

Magnitude Estimation to Estimate the Effect of KO on Saltiness:

Once the panellists were trained on the use of magnitude estimation, the effect of KO on saltiness perception was evaluated using magnitude estimation. In magnitude estimation, a reference solution is assigned a value and the panellists are asked to assign a value for saltiness proportional to the value of the reference solution, as described above in Part C of the training guidelines for magnitude estimation.

Samples containing KO and sodium chloride were prepared in Milli-Q™ water. The amount of added KO and the total sodium content in each sample is listed in Table 2. The total sodium content in Table 2 takes into account the sodium content of KO.

TABLE 2

Concentration of KO and total sodium content in test samples

| KO (% w/v) | Total sodium in samples (% w/v) | | | | |
|---|---|---|---|---|---|
| 0 | 0.031 | 0.059 | 0.110 | 0.204 | 0.382 |
| 0.094 | 0.034 | 0.062 | 0.113 | 0.207 | 0.385 |
| 0.141 | 0.036 | 0.063 | 0.115 | 0.209 | 0.386 |
| 0.188 | 0.037 | 0.065 | 0.116 | 0.210 | 0.387 |

Two solutions of each of the samples in Table 2 (for a total of 40 solutions) were presented to the panellists in a random order together with a reference solution that was assigned a value of 10. A ballot providing instructions to assess the solutions and record numerical values for the various solutions was also presented. Initially, the panellists were presented with two sets of solutions with a five-minute break between sets. Panellists were encouraged to rinse very well between solutions so that no carry-over or fatigue was noticed. Panellists were also instructed to resample the reference solution as often as required.

Results:

KO has a slight brown (beige) colour in its powder form. When dissolved in hot water at a concentration of 0.188% (w/v), KO exhibits a clear, very pale, yellow/golden colour. KO itself has an odour and flavour of cooked bone, marrow, meat and broth.

FIG. 1 is a graph of log [magnitude estimation of saltiness] versus log [total Na (% w/v)] for sample solutions listed in Table 2. The line for 0.141% (w/v) of KO has been omitted from FIG. 1 for clarity since it is very close to the line for 0.094% (w/v) KO. It is evident from FIG. 1 that when the log of the total concentration of sodium is less than about −0.7, the addition of KO increases the saltiness perception relative to a sample that has no added KO. A log value of about −0.7 for sodium concentration in FIG. 1 corresponds to a total sodium concentration of about 0.2% (w/v).

Figure 2:
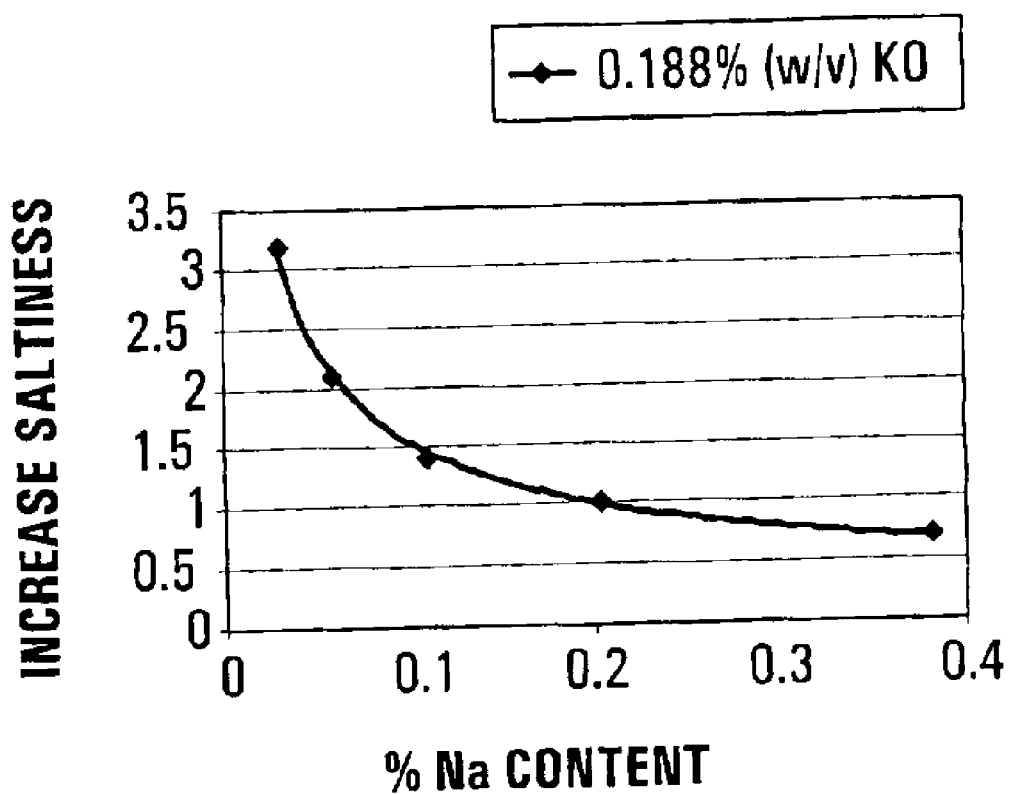
FIG. 2 is a graph depicting increase in saltiness perception versus total sodium content for sample solutions containing 0.188% (w/v) of katsuobushi oligopeptide (KO).

The increase in perceived saltiness for each sample having 0.188% (w/v) KO is listed in Table 3 and depicted graphically in FIG. 2. It is apparent from Table 3 and FIG. 2 that KO effectively enhances saltiness flavour, particularly at lower salt (Na) concentrations of the sample.

TABLE 3

Increase in saltiness due to 0.188% (w/v) KO

| Total Na content (% w/v) | Increase in saltiness (multiple of reference) |
|---|---|
| 0.037 | 3.2 |
| 0.065 | 2.1 |
| 0.116 | 1.4 |
| 0.210 | 1.0 |
| 0.387 | 0.7 |

The results generally indicate that bonito hydrolysate, for example katsuobushi oligopeptide (KO), could be used as a salt replacement in foods and beverages.

Having thus described the invention, it is apparent to one skilled in the art that modifications can be made without departing from the spirit and scope of the claims that now follow.

What is claimed is:

1. A method comprising the step of adding bonito hydrolysate in place of salt to a food or beverage formulation, thereby resulting in the food or beverage having a reduced salt content while maintaining a saltier taste than would otherwise be perceived at the reduced salt content without said hydrolysate, wherein the salt content of the food or beverage is about 0.5% (w/v) or less, based on total concentration of sodium.

2. The method according to claim 1, wherein the bonito hydrolysate is added to the food or beverage formulation as a powder, as a compact solid, as a solution in a liquid and/or as a paste.

3. The method according to claim 1, wherein the bonito hydrolysate is added in an amount of about 0.5% (w/v) or less.

4. The method according to claim 1, wherein the bonito hydrolysate is added in an amount of from about 0.05% to about 0.5% (w/v).

5. The method according to claim 1, wherein the bonito hydrolysate is added in an amount of from about 0.05% to about 0.2% (w/v).

6. The method according to claim 1, wherein the bonito hydrolysate is added in an amount of about 0.2% (w/v).

7. The method according to claim 1, wherein the bonito hydrolysate is added in an amount of about 0.1% (w/v).

8. The method according to claim 1, wherein the food or beverage is a soup or soup base.

9. A method comprising the step of adding bonito hydrolysate in place of salt to a food or beverage formulation, thereby resulting in the food or beverage having a reduced salt content while maintaining a saltier taste than would otherwise be perceived at the reduced salt content without said hydrolysate, wherein the salt content of the food or beverage is about 0.2% (w/v) or less, based on total concentration of sodium.

10. The method according to claim 9, wherein the bonito hydrolysate is added to the food or beverage formulation as a powder, as a compact solid, as a solution in a liquid and/or as a paste.

11. The method according to claim 9, wherein the bonito hydrolysate is added in an amount of about 0.5% (w/v) or less.

12. The method according to claim 9, wherein the bonito hydrolysate is added in an amount of from about 0.05% to about 0.5% (w/v).

13. The method according to claim 9, wherein the bonito hydrolysate is added in an amount of from about 0.05% to about 0.2% (w/v).

14. The method according to claim 9, wherein the bonito hydrolysate is added in an amount of about 0.2% (w/v).

15. The method according to claim 9, wherein the bonito hydrolysate is added in an amount of about 0.1% (w/v).

16. The method according to claim 9, wherein the food or beverage is a soup or soup base.

17. The method according to claim 1, wherein the bonito hydrolysate comprises katsuobushi oligopeptide.

18. The method according to claim 9, wherein the bonito hydrolysate comprises katsuobushi oligopeptide.

19. A food or beverage formulation comprising bonito hydrolysate, wherein the food or beverage has a reduced salt content while maintaining a saltier taste than would otherwise be perceived at the reduced salt content without said hydrolysate, and wherein the food or beverage formulation has a salt content of about 0.5 percent (w/v) or less, based on the total concentration of sodium.

20. The food or beverage formulation according to claim 19, wherein the salt content of the food or beverage formulation is about 0.2% (w/v) or less, based on the total concentration of sodium.

21. The food or beverage formulation according to claim 19, wherein the food or beverage is a soup or soup base.

22. The food or beverage formulation according to claim 19, wherein the bonito hydrolysate is present in an amount of about 0.5% (w/v) or less.

23. The food or beverage formulation according to claim 19, wherein the bonito hydrolysate is present in an amount of from about 0.05% to about 0.5% (w/v).

24. The food or beverage formulation according to claim 19, wherein the bonito hydrolysate is present in an amount of from about 0.05% to about 0.2% (w/v).

25. The food or beverage formulation according to claim 19, wherein the bonito hydrolysate is present in an amount of about 0.2% (w/v).

26. The food or beverage formulation according to claim 19, wherein the bonito hydrolysate is present in an amount of about 0.1% (w/v).

* * * * *